United States Patent [19]
Traxlmayr et al.

[11] Patent Number: 5,933,300
[45] Date of Patent: Aug. 3, 1999

[54] RECORDING AND/OR REPRODUCING DEVICE WITH A MAGNETIC HEAD HAVING AN OPTIMIZED CRYSTAL ORIENTATION

[75] Inventors: Ulrich Traxlmayr, Laxenberg; Othmar Gaisberger, Vienna, both of Austria

[73] Assignee: U.S. Philips Corporation, New York, N.Y.

[21] Appl. No.: 09/024,633

[22] Filed: Feb. 17, 1998

[30] Foreign Application Priority Data

Feb. 24, 1997 [EP] European Pat. Off. .............. 97890030

[51] Int. Cl.⁶ .................................................. G11B 5/127
[52] U.S. Cl. ............................................................ 360/125
[58] Field of Search .................... 360/119, 120, 360/122, 125, 126

[56] References Cited

U.S. PATENT DOCUMENTS 4,731,683  3/1988  Otomo ..................................... 360/125

FOREIGN PATENT DOCUMENTS

3244160  6/1983  Germany ........................ G11B 5/193

Primary Examiner—A. J. Heinz
Attorney, Agent, or Firm—David R. Treacy

[57] ABSTRACT

Recording and/or reproducing device (1) having at least one magnetic head (8, 9) provided for scanning a magnetic record carrier (6) and having a lead-in core limb (34) and a lead-out core limb (35) each consisting of a monocrystalline ferrite and constituting a transducing gap (37), in which the lead-in core limb (34) has a mechanical main direction (39) in a <100>-direction of its monocrystalline ferrite, which main direction encloses an acute angle $\Theta_E$ with respect to the transducing gap (37), and in which the lead-out core limb (35) has a mechanical main direction (41) in a <100>-direction of its monocrystalline ferrite, which main direction encloses a second acute angle $\Theta_A$ with respect to the transducing gap (37), the two acute angles $\Theta_E$ and $\Theta_A$ in the magnetic head (8, 9) being determined in such a way that ferrite material is uniformly worn off the two core limbs (34, 35) at essentially the same wear rate (K) when there is a relative movement between a record carrier (6) and the magnetic head (8, 9).

10 Claims, 4 Drawing Sheets

RECORDING AND/OR REPRODUCING DEVICE WITH A MAGNETIC HEAD HAVING AN OPTIMIZED CRYSTAL ORIENTATION

The invention relates to a recording and/or reproducing device having at least one magnetic head whose head face can be brought to a scanning contact with a magnetic record carrier, in which scanning contact a relative movement which is essentially parallel to a reference plane occurs between the record carrier and the magnetic head, said magnetic head having a lead-in core limb and a lead-out core limb both of which terminate in the head face and jointly constitute a transducing gap terminating in a gap-depth extension in the head face and enclosing a given angle of inclination with respect to the reference plane, both core limbs consisting of a monocrystalline ferrite in which the (110) planes of the monocrystalline ferrites of the two core limbs extend essentially perpendicularly to the transducing gap, the lead-in core limb having a mechanical main direction in a <100>-direction of its monocrystalline ferrite, which main direction is in the (110) plane and encloses a first acute angle $\Theta_E$ with respect to the gap-depth extension in the lead-in core limb, and the lead-out core limb having a mechanical main direction in a <100>-direction of its monocrystalline ferrite, which main direction is in the (110) plane and encloses a second acute angle $\Theta_A$ with respect to the gap-depth extension in the lead-out core limb, and in which a record carrier wears off ferrite material, on the two core limbs in the area of the head face when there is a relative movement between said record carrier and the magnetic head.

The invention also relates to a magnetic head for use in a recording and/or reproducing device having at least one magnetic head whose head face can be brought to a scanning contact with a magnetic record carrier, in which scanning contact a relative movement which is essentially parallel to a reference plane occurs between the record carrier and the magnetic head, said magnetic head having a lead-in core limb and a lead-out core limb both of which terminate in the head face and jointly constitute a transducing gap terminating in a gap-depth extension in the head face and enclosing a given angle of inclination with respect to the reference plane, both core limbs consisting of a monocrystalline ferrite in which the (110) planes of the monocrystalline ferrites of the two core limbs extend essentially perpendicularly to the transducing gap, the lead-in core limb having a mechanical main direction in a <100>-direction of its monocrystalline ferrite, which main direction is in the (110) plane and encloses a first acute angle $\Theta_E$ with respect to the gap-depth extension in the lead-in core limb, and the lead-out core limb having a mechanical main direction in a <100>-direction of its monocrystalline ferrite, which main direction is in the (110) plane and encloses a second acute angle $\Theta_A$ with respect to the gap-depth extension in the lead-out core limb, and in which a record carrier wears off ferrite material on the two core limbs in the area of the head face when there is a relative movement between said record carrier and the magnetic head.

Such a device as described in the opening paragraph as well as such a magnetic head as described in the second paragraph are known from, for example DE 32 44 160 C2. FIG. 4 of this document shows a known magnetic head of the known device in which the angles $\Theta_E$ and $\Theta_A$ of the mechanical main directions of the monocrystalline ferrites of the lead-in core limb and the lead-out core limb have the same angle value and are consequently symmetrical to the gap-depth extension. The acute angles $\Theta_E$ and $\Theta_A$ are fixed in such a way that magnetical main directions of the monocrystalline ferrites which are also situated in the (110) plane of the monocrystalline ferrites and are perpendicular to the mechanical main directions of the monocrystalline ferrites extend in such a way that a magnetic head having satisfactory recording and reproduction properties is obtained.

However, in the known device, it has become apparent that the magnetic head loses its satisfactory recording and reproduction properties after a comparatively long period of operation. Investigations of the known magnetic head of the known device have proved that due to relative movements between the scanned record carriers and the magnetic head comprising the lead-in core limb and the lead-out core limb, the ferrite material of the lead-out core limb is worn off at a larger wear rate in the area of the head face than the ferrite material of the lead-in core limb. Consequently, a step is formed already after a relatively short period of operation of the device in the head face, namely in the area of the transducing gap, essentially parallel to the gap-depth extension, so that then a correct contact of the record carrier with the head face of the magnetic head and thus the correct scanning connection between the magnetic head and the record carrier is disturbed and further affects the recording and reproduction properties of the known magnetic head so that the recording and reproducing conditions in the known device are detrimentally influenced.

When the known device with the known magnetic head, whose lead-in core limb has a very small wear rate and in which a step has already been detrimentally formed in its head face, is used under given climatic conditions, for example at a humidity of less than 10%, and when there is a relative movement between a record carrier and the magnetic head, then a non-uniform, i.e. partial wear of ferrite material in the area of the head face occurs on the lead-in core limb due to the very small wear rate of the lead-in core limb, so that additionally a pattern of ripples is produced and the lead-in core limb is thus no longer smooth in its head face area. Such a pattern of ripples on the lead-in core limb causes vibrations in the magnetic head whenever there is a relative movement between a record carrier and the magnetic head, which vibrations, due to the magnetostrictive properties of the monocrystalline ferrite, result in a change of the magnetic flux in the magnetic circuit and finally in unwanted rubbing noise which is superimposed on a recording signal voltage or a reproducing signal voltage of the magnetic head and consequently further deteriorates the recording and reproducing conditions in the known device.

It is an object of the invention to eliminate the above-mentioned drawbacks and to improve a device as described in the opening paragraph and a magnetic head as described in the second paragraph and provide an improved device and an improved magnetic head, in which the magnetic head has very satisfactory mechanical properties and consequently very satisfactory recording and reproduction properties of the improved magnetic head and satisfactory recording and reproducing conditions in the improved device are guaranteed for a long period of operation, i.e. substantially throughout the lifetime of the magnetic head.

To solve this object, a device according to the invention, as described in the opening paragraph, is characterized in that the first acute angle $\Theta_E$ between the mechanical main direction of the monocrystalline ferrite of the lead-in core limb and the gap-depth extension is larger than the second acute angle $\Theta_A$ between the mechanical main direction of the monocrystalline ferrite of the lead-out core limb and the gap-depth extension, and in that, for forming the magnetic head, the lead-in core limb and the lead-out core limb are combined at such differently large acute angles $\Theta_E$ and $\Theta_A$ between the mechanical main directions of the monocrystalline ferrites and the gap-depth extension that ferrite material is uniformly worn off both core limbs at essentially the same wear rate when there is a relative movement between the record carrier and the magnetic head. In this way, a device is obtained in which a step is prevented from being formed or produced in the gap-depth extension of the head face of the magnetic head, namely in the area of the transducing gap and in which there is consequently a satisfactory scanning contact between the magnetic head and the record carrier substantially throughout the lifetime of the magnetic head so that satisfactory recording and reproducing conditions in the device are obtained for a long period of operation. Even when the device is used under unfavorable climatic conditions, in which the humidity decreases, for example below 10%, at when there is a relative movement between a record carrier and the magnetic head, no ripple pattern is formed on the lead-in core limb in the area of the head face so that the occurrence of unwanted rubbing noise is avoided and the satisfactory recording and reproducing conditions in the device are thus also maintained at such unfavorable climatic conditions.

A further device is known from DE 32 44 160 C2 with a magnetic head shown in FIG. 12 of this document, in which magnetic head a first acute angle $\Theta_E$ of the mechanical main direction of the monocrystalline ferrite of the lead-in core limb is smaller than a second obtuse angle $\Theta_A$ of the mechanical main direction of the monocrystalline ferrite of the lead-out core limb. In this known magnetic head, relatively small wear rates of the two core limbs and thus a relatively long period of operation or lifetime of the magnetic head are achieved, but the magnetical main direction of the monocrystalline ferrite of the lead-out core limb is unfavorably fixed with a view to the envisaged achievement of satisfactory recording and reproduction properties, while furthermore this known magnetic head has also different rates of wear of its two core limbs so that the afore-mentioned difficulties also occur in this further known device and magnetic head.

In a device according to the invention, it has been found to be advantageous when the acute angles $\Theta_E$ and $\Theta_A$ between the mechanical main directions of the monocrystalline ferrites of the lead-in core limb and the lead-out core limb and the gap-depth extension are defined by the equation $\Theta_E = \Theta_A + A$, in which A is a constant angle value. The angle values of the acute angles $\Theta_E$ and $\Theta_A$ of the mechanical main directions of the monocrystalline ferrites of the lead-in core limb and the lead-out core limb can thus be determined and fixed in a simple manner, and a device with a magnetic head having satisfactory qualities in a mechanical and magnetical respect is obtained so that very satisfactory recording and reproducing conditions are guaranteed for a long period of operation of the device.

In a device according to the invention, it has further appeared to be advantageous when the angle $\Theta_E$ ranges between 35° and 80° and the constant angle value A ranges between 10° and 25°. By fixing the constant angle value A in a range between 10° and 25° it is prevented that a step is formed or produced in the gap-depth extension of the head face, namely in the area of the transducing gap. By additionally fixing the acute angle $\Theta_E$ at $\Theta_E > 35°$ it is achieved that the lead-in core limb has such a small wear rate that a small, steady and uniform quantity of ferrite material is worn off the lead-in core limb when there is a relative movement between a record carrier and a magnetic head, so that a ripple pattern is also prevented because of the uniform wear. Consequently, these values of the angles $\Theta_E$ and $\Theta_A$ of the mechanical main directions of the monocrystalline ferrites of the lead-in core limb and the lead-out core limb have been found to be very advantageous with a view to the long-time guarantee of very satisfactory recording and reproducing conditions in a device according to the invention.

In a device according to the invention, it has further been found to be advantageous when the angle $\Theta_E$ has the angle value $\Theta_E = 53°$ and the angle $\Theta_A$ has the angle value $\Theta_A = 35°$. Due to the combination of a lead-in core limb and a lead-out core limb at these values of the angles $\Theta_E$ and $\Theta_A$ of the mechanical main directions of the monocrystalline ferrites, a magnetic head for a device according to the invention is obtained in which the formation of a step in the head face as well as the formation of a ripple pattern are prevented and also a very long lifetime of the magnetic head is obtained so that very satisfactory recording and reproducing conditions in the device are guaranteed for a long period of operation.

In a device according to the invention, it has further been found to be advantageous when, in addition to the lead-in core limb and the lead-out core limb, the magnetic head has at least one terminating core limb consisting of a polycrystalline ferrite which is connected to one of the two core limbs and terminates in the head face. In this way, a device with a magnetic head is obtained in which the uniform wear of ferrite material at the same rate of wear on both core limbs is additionally supported by means of at least one terminating core limb and in which rubbing noise due to magnetostrictive properties of monocrystalline ferrites is essentially reduced when vibrations occur in the magnetic head. Such a magnetic head thus has very satisfactory recording and reproduction properties and very satisfactory mechanical properties so that in a device according to the invention, using such a magnetic head, very satisfactory recording and reproducing conditions are guaranteed for a long period of operation.

To solve the object elucidated hereinbefore, a magnetic head according to the invention, of the type described in the second paragraph, is characterized in that the first acute angle $\Theta_E$ between the mechanical main direction of the monocrystalline ferrite of the lead-in core limb and the gap-depth extension is larger than the second acute angle $\Theta_A$ between the mechanical main direction of the monocrystalline ferrite of the lead-out core limb and the gap-depth extension, and in that, for forming the magnetic head, the lead-in core limb and the lead-out core limb are combined at such differently large acute angles $\Theta_E$ and $\Theta_A$ between the mechanical main directions of the monocrystalline ferrites and the gap-depth extension that ferrite material is uniformly worn off both core limbs at essentially the same wear rate when there is a relative movement between the record carrier and the magnetic head. In this way, a magnetic head is obtained in which a step is prevented from being produced or formed in the depth-gap extension of the head face, namely in the area of the transducing gap and in which there is consequently a satisfactory scanning contact between the magnetic head and a record carrier substantially throughout the lifetime of the magnetic head so that satisfactory recording and reproduction properties of the magnetic head are obtained for a long period of operation. Even when under unfavorable climatic conditions, in which the humidity decreases, for example below 10%, there is a relative movement between a record carrier and the magnetic head, no ripple pattern is formed on the lead-in core limb in the area of the head face so that the occurrence of unwanted rubbing noise is avoided and the magnetic head thus maintains its satisfactory recording and reproduction properties.

A further magnetic head is known from DE 32 44 160 C2 which is shown in FIG. 12 of this document and in which a first acute angle $\Theta_E$ of the mechanical main direction of the monocrystalline ferrite of the lead-in core limb is smaller than a second obtuse angle $\Theta_A$ of the mechanical main direction of the monocrystalline ferrite of the lead out core limb. In this known magnetic head, relatively small rates of wear of the two core limbs and thus a relatively long period of operation or lifetime of the magnetic head are achieved, but the magnetical main direction of the monocrystalline ferrite of the lead-out core limb is unfavorably fixed with a view to the envisaged achievement of satisfactory recording and reproduction properties and, moreover, this known magnetic head has also different rates of wear of the two core limbs so that the afore-mentioned difficulties also occur in this further known magnetic head.

In a magnetic head according to the invention, it has further been found to be advantageous when the acute angles $\Theta_E$ and $\Theta_A$ between the mechanical main directions of the monocrystalline ferrites of the lead-in core limb and the lead-out core limb and the gap-depth extension are defined by the equation $\Theta_E = \Theta_A + A$, in which A is a constant angle value. The values of the acute angles $\Theta_E$ and $\Theta_A$ of the mechanical main directions of the monocrystalline ferrites of the lead-in core limb and the lead-out core limb can thus be determined and fixed in a simple manner, and a satisfactory magnetic head is obtained, both in a mechanical and a magnetical respect, ensuring satisfactory recording and reproduction properties for a long period of operation.

In a magnetic head according to the invention, it has further been found to be advantageous when the angle $\Theta_E$ ranges between 35° and 80° and the constant angle value A ranges between 10° and 25°. By fixing the constant angle value A in a range between 10° and 25°, a step is prevented from being formed or produced in the gap-depth extension of the head face, namely in the area of the transducing gap. By additionally fixing the acute angle $\Theta_E$ at $\Theta_E > 35°$, it is achieved that the lead-in core limb has such a small wear rate that a small, steady and uniform quantity of ferrite material is worn off the lead-in core limb when there is a relative movement between a record carrier and the magnetic head, so that a ripple pattern is also prevented because of the uniform wear. Consequently, these values of the angles $\Theta_E$ and $\Theta_A$ of the mechanical main directions of the monocrystalline ferrites of the lead-in core limb and the lead-out core limb have proved to be very advantageous with a view to the long-time guarantee of very satisfactory recording and/or reproduction properties of a magnetic head according to the invention.

In a magnetic head according to the invention, it has further been proved to be advantageous when the angle $\Theta_E$ has the angle value $\Theta_E = 53°$ and the angle $\Theta_A$ has the angle value $\Theta_A = 35°$. Due to the combination of a lead-in core limb and a lead-out core limb at these values of the angles $\Theta_E$ and $\Theta_A$ of the mechanical main directions of the monocrystalline ferrites, a magnetic head according to the invention is obtained in which the formation of a step in the head face as well as the formation of a ripple pattern are prevented and also a very long lifetime of the magnetic head is obtained so that very satisfactory recording and reproduction properties are obtained for a long period of operation.

In a magnetic head according to the invention, it has further been proved to be very advantageous when, in addition to the lead-in core limb and the lead-out core limb, the magnetic head has at least one terminating core limb consisting of a polycrystalline ferrite which is connected to one of the two core limbs and terminates in the head face.

In this way, a magnetic head is obtained in which the uniform wear of ferrite material at the same rate of wear of both core limbs is additionally supported by means of at least one terminating core limb and in which rubbing noise due to magnetostrictive properties of monocrystalline ferrites is essentially reduced when vibrations occur in the magnetic head. Such a magnetic head thus has very satisfactory recording and reproduction properties and very satisfactory mechanical properties.

These and other aspects of the invention are apparent from and will be elucidated with reference to the embodiments described hereinafter.

Figure 1:
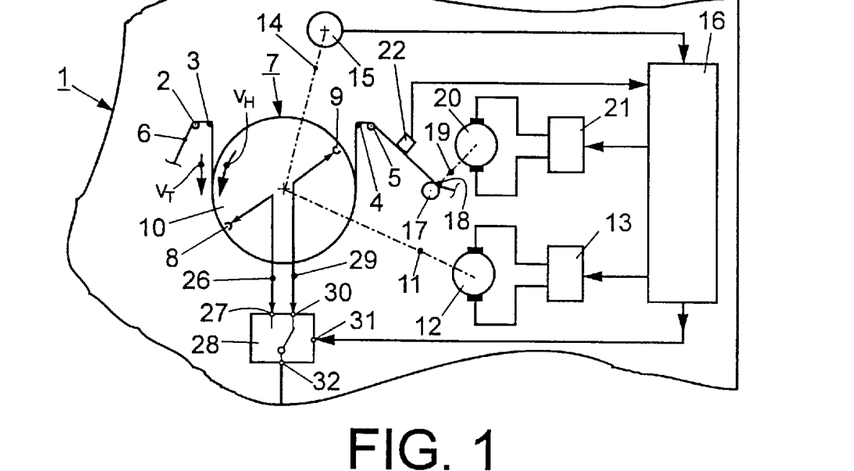
FIG. 1 is a cross-sectional view of a recording and reproducing device in accordance with a first embodiment of the invention, comprising two magnetic heads.

FIG. 1 is a cross-sectional view of a recording and reproducing device 1 shown diagrammatically, which will hereinafter be referred to as device 1 for short. A magnetic tape cassette (not shown) is insertable into the device 1. After such a magnetic tape cassette has been inserted into the device 1, the cassette takes up an operating position in which, with the aid of adjustable tape guides 2 and 3 and 4 and 5 of a tape transport device, the magnetic tape 6 accommodated in the magnetic tape cassette and constituting a magnetic record carrier is drawn from the magnetic tape cassette and wound around a drum-shaped scanning device 7 of the device 1. The drum-shaped scanning device 7 comprises a predetermined number of magnetic heads which can be rotatably driven, i.e. two magnetic heads 8 and 9 in the relevant case, which can be brought to a scanning contact with the magnetic tape 6. The magnetic heads 8 and 9 are secured to a rotatably driven drum section 10 of the drum-shaped scanning device 7, which rotatably driven drum section 10 drives the magnetic heads 8 and 9 in a rotatable manner at a magnetic head velocity of $V_H$.

The rotatably driven drum section 10 can be driven via a drive connection 11, shown diagrammatically by way of a dot-and-dash line, of a first motor 12 having an adjustable rotational speed. The first motor 12 is powered by a first supply circuit 13. As is shown by way of a dot-and-dash line 14, the rotatably driven drum section 10 is coupled to a tacho-generator 15 which supplies a tacho-signal proportional to each actual number of rotations of the rotatably driven drum section 10. The tacho-signal can be supplied to a microcomputer 16 which supplies control signals to the first supply circuit 13 so as to control the velocity $V_H$ of the magnetic heads at the predetermined value $V_H$.

In the recording mode or the reproduction mode of the device 1, the magnetic tape 6, aided by an adjustable roll 17, engages a tape drive shaft 18 with which the magnetic tape 6 can be driven at a magnetic tape velocity $V_T$. The tape drive shaft 18 can be driven by a rotationally adjustable second motor 20 via a drive connection 19 shown by way of a dot-and-dash line. The second motor 20 is powered by a second supply circuit 21.

A CTL magnetic head 22 is in scanning contact with the magnetic tape 6. In the reproduction mode of the device 1, CTL pulses recorded on the magnetic tape 6 by means of the CTL magnetic head 22 are reproduced and applied to the microcomputer 16 which supplies control signals to the second supply circuit 21 so as to control the magnetic tape velocity $V_T$ at a desired value $V_T$.

In the recording mode or the reproduction mode, the magnetic head velocity $V_H$ and the magnetic tape velocity $V_T$ have mutually different values, namely the magnetic head velocity $V_H$ is much larger than the magnetic tape velocity $V_T$ so that there is a relative movement between the magnetic tape 6 and the magnetic heads 8 and 9. In the reproduction mode, a reproduction signal voltage $U_S$ can be supplied to two head coil contacts 23 and 24 of a head coil 25 of the magnetic head 8 when there is a relative movement between the magnetic head 8, shown in FIG. 2, which is in scanning contact with the magnetic tape 6, and the magnetic head 9. The reproduction signal voltage $U_S$ which can be supplied to the two head coil contacts 23 and 24 can be applied to a first input 27 of a head-switching stage 28 via a connection 26 which is shown diagrammatically. In the reproduction mode, a reproduction signal voltage $U_S$ can also be applied in an analog manner from the magnetic head 9 via a connection 29 diagrammatically shown to the second input 30 of the head-switching stage 28 when there is a relative movement between the magnetic head 9, which is in scanning contact with the magnetic tape 6, and the magnetic tape 6.

Control signals can be supplied by the microcomputer 16 to a control input 31 of the head-switching stage 28. Dependent on the control signals at the control input 31, the first input 27 or the second input 30 is connected to an output 32 of the head-switching stage 28. By corresponding control with the aid of the microcomputer 16, the reproduction signal voltage $U_S$ of one of the two magnetic heads 8 and 9 can be supplied at the output 32, namely each of the magnetic heads 8 or 9 which is in scanning contact with the magnetic tape 6. The reproduction signal voltage $U_S$ which can be supplied at the output 32 of the head-switching stage 28 can be further processed in the device 1 by reproduction-signal-processing means (not shown in FIG. 1) and can be supplied by the device 1 to a display device, for example a television apparatus.

In the recording mode, an input signal of the device 1 can be processed by recording-signal-processing means (not shown in the Figure) which supply a recording-signal voltage $U_S$ that can be applied to the two magnetic heads 8 and 9 so that recording is effected with the relevant magnetic head 8 or 9 in scanning contact with the magnetic tape 6.

Figure 2:
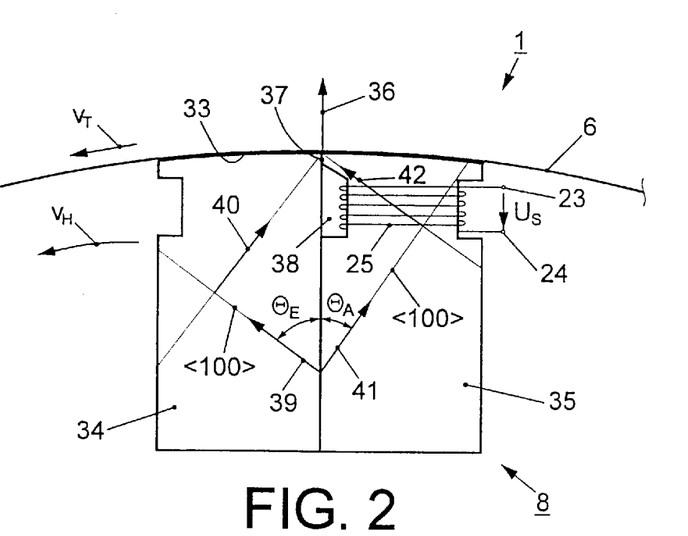
FIG. 2 shows a magnetic head of the recording and reproducing device in accordance with the first embodiment of the invention.
Figure 3:
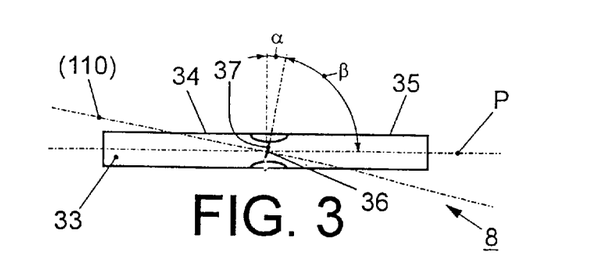
FIG. 3 is an elevational view of the head face of the magnetic head, shown in FIG. 2, of the recording and reproducing device in accordance with the first embodiment of the invention.

FIGS. 2 and 3 show the magnetic head 8 of the device 1 which can be brought to a scanning contact with the head face 33 of the magnetic tape 6 in a recording mode and in a reproduction mode, in which a relative movement between the magnetic tape 6 and the magnetic head 8 occurs essentially parallel to a reference plane P.

The magnetic head 8 has a lead-in core limb 34 and a lead-out core limb 35 both of which terminate in the head face 33 and jointly constitute a transducing gap 37 terminating in a gap-depth extension 36, indicated by an arrow, in the head face 33, which transducing gap encloses a given angle of inclination β with respect to the reference plane P. The angle of inclination β may be, for example +84° or +60° and is fixed at an azimuth angle α as a complement at 90°, which azimuth angle α may be, for example +6° or +30°.

It is to be noted that the structure of the magnetic head 9 corresponds to the structure of the magnetic head 8 shown in FIG. 2 and 3, but the transducing gap of the magnetic head 9 has the opposite angle of inclination β, i.e., for example −84° or −60°, and the opposite azimuth angle α, i.e., for example −6° or −30°.

It is to be noted that the angle of inclination β of the transducing gap of a magnetic head may also be 90°, in which case the azimuth angle a has a value of 0°.

A recess of the lead-out core limb 35 constitutes a winding aperture 38 of the magnetic head 8 through which the turns of the head coil 25 are passed. It may be noted that a winding aperture through which the turns of a head coil are passed may alternatively be constituted by a recess of a lead-in core limb. Alternatively, both the lead-in core limb 34 and the lead-out core limb 35 may have a recess.

The two core limbs 34 and 35 consist of a monocrystalline ferrite in which the (110)-planes of the monocrystalline ferrites are essentially perpendicular to the transducing gap 37, as is shown diagrammatically in FIG. 3.

The lead-in core limb 34 of the magnetic head 8 has a mechanical main direction 39 in a <100>-direction of its monocrystalline ferrite, which main direction is in the (110) plane and encloses a first acute angle $\Theta_E$ with respect to the gap-depth extension 36 in the lead-in core limb 34. The lead-in core limb 34 further has a magnetical main direction 40 extending perpendicularly to the mechanical main direction 39 and also being situated in the (110) plane of the monocrystalline ferrite. The lead-out core limb 35 has a mechanical main direction 41 in a <100>-direction of its monocrystalline ferrite, which main direction is in the (110) plane and encloses a second acute angle $\Theta_A$ with respect to the gap-depth extension 36 in the lead-out core limb 35. The lead-out core limb 35 further has a magnetical main direction 42 extending perpendicularly to the mechanical main direction 39 and also being situated in the (110) plane of the monocrystalline ferrite. Magnetical main directions of monocrystalline ferrites characterize directions of a very satisfactory magnetic conductance of the monocrystalline ferrites. By advantageously fixing the magnetical main directions 40 and 41 of the monocrystalline ferrites of the lead-in core limb 34 and the lead-out core limb 35, the magnetic circuit of the magnetic head 8 constituted by the two core limbs 34 and 35 can be given optimal magnetical properties so that the recording and reproduction properties of the magnetic head 8 are improved. By advantageously fixing the mechanical main directions 39 and 41 of the lead-in core limb 34 and the lead-out core limb 35, the mechanical properties, particularly the rubbing behavior of the magnetic head in the area of its head face 33, can be optimized so that the mechanical properties of the magnetic head 8 are improved.

Figure 7:
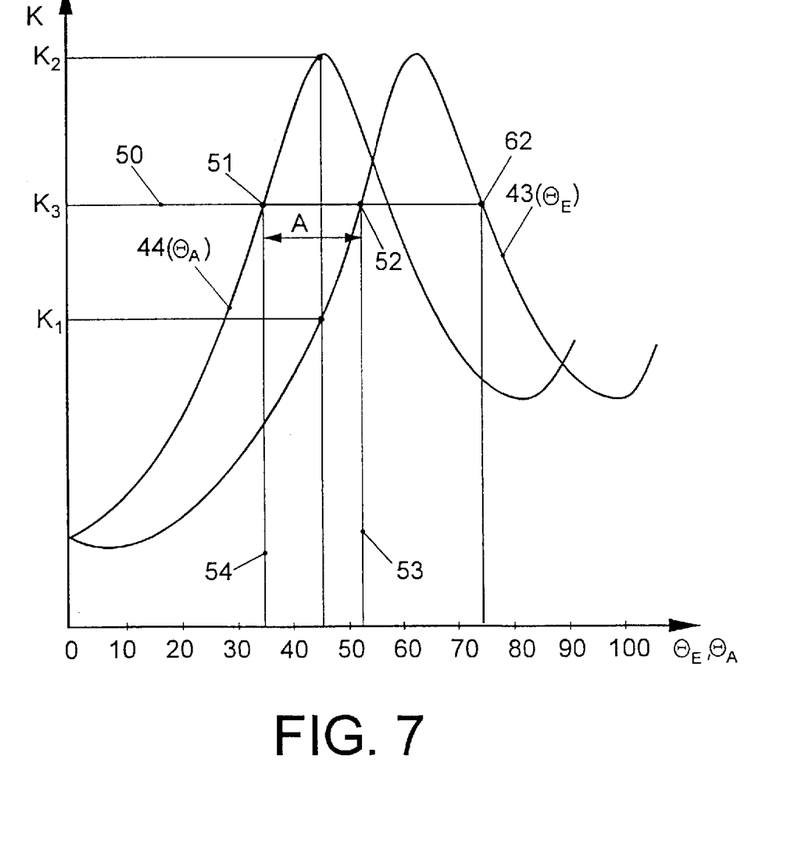
FIG. 7 is a diagram in which the dependence of the wear rate K of a lead-in core limb on an angle $\Theta_E$ between a mechanical main direction of the lead-in core limb and a gap-depth extension, as well as the dependence of the wear rate K of a lead-out core limb on an angle $\Theta_A$ between a mechanical main direction of the lead-out core limb and the gap-depth extension are shown in the form of two curves.

When there is a relative movement between the magnetic magnetic tape 6 and the magnetic head 8, ferrite material is worn off by the magnetic tape 6 on the two core limbs 34 and 35 in the area of the head face 33. A wear rate K is a measure of the volume of ferrite material worn off by the magnetic tape 6 on the two core limbs 34 and 35 in the area of the head face 33. FIG. 7 is a diagram in which the dependence of the wear rate K of the lead-in core limbs 34 on the angle $\Theta_E$ between the mechanical main direction 39 of the lead-in core limb 34 and the gap-depth extension 36, as well as the dependence of the wear rate K of the lead-out core limb 35 on the angle $\Theta_A$ between the mechanical main direction 41 of the lead-out core limb 35 and the gap-depth extension 36 are shown in the form of two curves 43 and 44.

In the magnetic head 8 of the device 1, the first acute angle $\Theta_E$ between the mechanical main direction 39 of the monocrystalline ferrite of the lead-in core limb 34 and the gap-depth extension 36 is advantageously larger than the second acute angle $\Theta_A$ between the mechanical main direction 41 of the monocrystalline ferrite of the lead-out core limb 35 and the gap-depth extension 36. Furthermore, for forming the magnetic head 8, the lead-in core limb 34 and the lead-out core limb 35 are combined at such differently large acute angles $\Theta_E$ and $\Theta_A$ between the mechanical main directions 39 and 41 of the monocrystalline ferrites and the gap-depth extension 36 that ferrite material is uniformly worn off both core limbs 34 and 35 at essentially the same wear rate K when there is a relative movement between the magnetic tape 6 and the magnetic head 8.

Advantageously, a device 1 is then obtained in which the head face 33 of its magnetic heads 8 and 9 is uniformly worn off when there is a relative movement between a record carrier and the magnetic heads 8 and 9 so that a record carrier uniformly engages the head face 33 throughout the lifetime of the magnetic heads 8 and 9 in the recording or reproduction mode, thus always ensuring a satisfactory scanning contact. Consequently, the device 1 has very satisfactory recording and reproduction properties for a long period of operation, i.e. substantially throughout the lifetime of the magnetic head.

Figure 4:
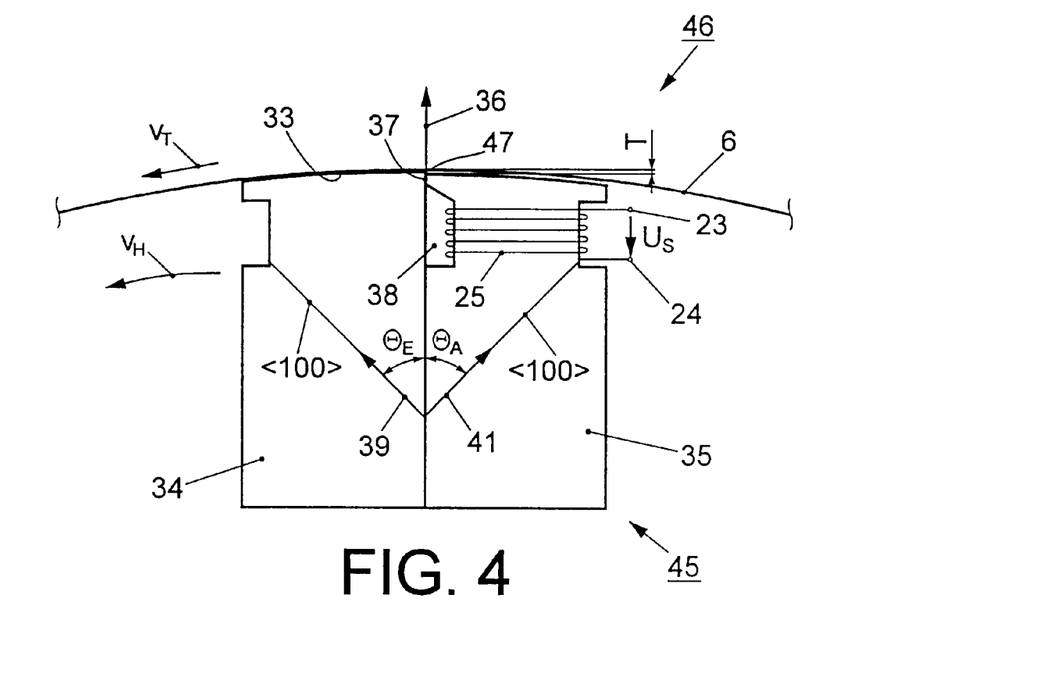
FIG. 4 shows a known magnetic head which has a step in the head face in the area of the transducing gap.

FIG. 4 shows a known magnetic head 45 of a known device 46 whose lead-in core limb 34 and lead-out core limb 35 are constituted by monocrystalline ferrites. In the known magnetic head 45, the acute angles $\Theta_E$ and $\Theta_A$ between the mechanical main directions 39 and 41 and the gap-depth extension 36 have the same value $\Theta_E=\Theta_A=45°$ and are thus symmetrically situated with respect to the gap-depth extension 36. As is shown in the diagram in FIG. 7, the lead-in core limb 34 is worn off at a wear rate $K_1$ as a result of the angle $\Theta_E=45°$ in the case of a relative movement between the magnetic tape 6 and the magnetic head 45, and the lead-out core limb 35 is worn off at an essentially larger wear rate $K_2$ as a result of the angle $\Theta_A=45$. Consequently, a step 47 having a depth T is formed already after a short period of operation of the known device 46 in the head face 33, namely in the area of the transducing gap 37 of the magnetic head 45, essentially parallel to the gap-depth extension 36, so that the correct engagement of the magnetic tape 6 with the head face 33 of the magnetic head 45 and thus the correct scanning contact between the magnetic head 45 and the magnetic tape 6 is disturbed and the recording and reproducing conditions in the known device 46 are detrimentally influenced.

In the device 1 according to the invention, the different acute angles $\Theta_E$ and $\Theta_A$ between the mechanical main directions 39 and 41 of the monocrystalline ferrites of the lead-in core limb 34 and the lead-out core limb 35 and the gap-depth extension 36 are advantageously combined in the magnetic head 8 and the magnetic head 9 in such a way that in the case of a relative movement between the magnetic tape 6 and the magnetic tape 8 or the magnetic tape 9, ferrite material is uniformly worn off the core limbs 34 and 35 at essentially the same rate $K_3$. Consequently, the formation of a step in the head face 33 is prevented, so that a satisfactory scanning contact between the magnetic head 8 and the magnetic head 9 and the magnetic tape is obtained substantially throughout the lifetime of the magnetic head 8 and the magnetic head 9 and thus satisfactory recording and reproducing conditions are given for a very long period of operation of the device 1.

Figure 5:
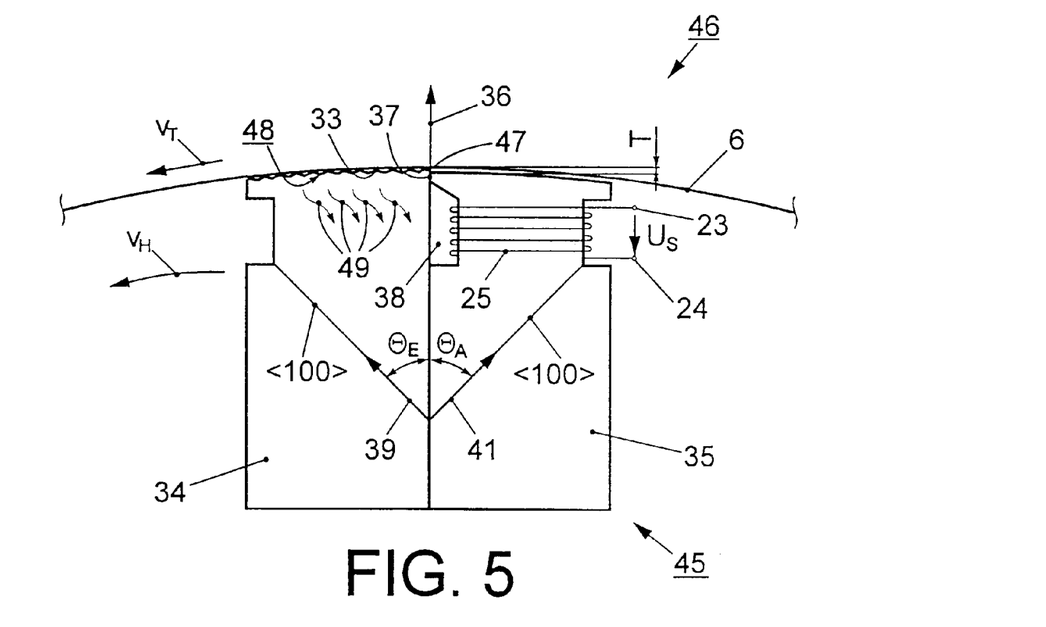
FIG. 5 shows a known magnetic head which has a step in the head face in the area of the transducing gap and whose head face has a ripple pattern in the area of the lead-in core limb.

FIG. 5 shows the known magnetic head 45 of the known device 46 in which a step 47 has already formed disadvantageously in the head face 33. When the known device 46 is used under given climatic conditions, for example at a humidity of less than 10%, and when there is a relative movement between the magnetic tape 6 and the known magnetic head 45, then an additional ripple pattern 48 caused by non-uniform, i.e. partial wear of ferrite material is formed on the lead-in core limb 34 in the area of the head face 33, so that the lead-in core limb 34 is no longer smooth in the area of the head face 33. Such a ripple pattern 48 on the lead-in core limb 34 results in vibrations 47 in the magnetic head 45 whenever there is a relative movement between the magnetic tape 6 and the known magnetic head 45, which vibrations are symbolically illustrated in FIG. 5 by means of arrows 49. The vibrations are excited by the magnetic head 45 having the ripple pattern 48 on the head face 33 of its lead-in core limb 34 when the magnetic tape 6 having a rough surface in a microscopical range is being scanned, and these vibrations propagate throughout the magnetic head 45 and are converted into magnetic flux changes via the magnetostrictive properties of the monocrystalline ferrite of the two core limbs 34 and 35, which changes induce rubbing noise in the head coil 25. This rubbing noise is superimposed on the reproduction signal voltage $U_S$ or on a recording signal voltage $U_S$ and thus leads to a further deterioration of the recording and reproduction properties of the known magnetic head 45 and the recording and reproducing conditions in the known device 46.

It may be noted that particularly the reproduction properties of the known magnetic head 45 are deteriorated by the rubbing noise superimposed on the reproduction signal voltage $U_S$ because reproduction signal voltages $U_S$ always have smaller voltage values than recording signal voltages $U_S$ so that each reproduction signal voltage $U_S$ is very strongly disturbed by a superimposed rubbing noise.

When the device 1 according to the invention is operated in the recording or reproduction mode under unfavorable climatic conditions in which, for example the humidity decreases below 10%, and when there is a relative movement between the magnetic tape 6 and the magnetic head 8, no ripple pattern is produced on the lead-in core limb 34 in the area of the head face 33 because the magnetic head 8 is uniformly worn off at a low rate K. Due to the constantly small wear of ferrite material on both core limbs, the formation of a ripple pattern is fully prevented, also when the device operates under unfavorable climatic conditions. Consequently, the occurrence of unwanted rubbing noise is avoided so that satisfactory recording and reproduction properties are obtained for the magnetic head 8 or the magnetic head 9, also in the case of unfavorable climatic conditions, and satisfactory recording and reproducing conditions are achieved in the known device 1, also in the case of unfavorable climatic conditions.

As is shown in the diagram in FIG. 7, acute angles $\Theta_E$ and $\Theta_A$ between the mechanical main directions 39 and 41 of the monocrystalline ferrites of the lead-in core limb 34 and the lead-out core limb 35 and the gap-depth extension 36 are determined, at which the same wear rate K, for example, wear rate $K_3$, is obtained by fixing a connection line 50 passing through the ordinate value $K_3$ and parallel to the abscissa, in which the points of intersection 51 and 52 of the connection line 50 are determined by means of each curve 44 and 43 and the abscissa values $\Theta_E$ and $\Theta_A$ associated with these points of intersection 51 and 52 are determined. However, alternatively, for example the angle $\Theta_E$ may be chosen with a view to optimum magnetical properties, and the point of intersection 52 of the ordinate line 53 with the curve 43 can be determined by means of this ordinate line 53 passing through the abscissa value corresponding to the chosen angle of $\Theta_E$, and subsequently the point of intersection 51 with the curve 44 can be determined by means of the connection line 50, and the associated angle $\Theta_A$ can be determined by means of a further ordinate line 54 passing through the point of intersection 51. However, the angle $\Theta_A$ and, analogously, the angle $\Theta_E$ may be determined first. Acute angles $\Theta_E$ and $\Theta_A$ determined in this way are defined by the equation $\Theta_E = \Theta_A + A$. Here, A is a constant angle value which is given by the distance between the two points of intersection 51 and 52 along the connection line 50. In this way, the values of the acute angles $\Theta_E$ and $\Theta_A$ between the mechanical main directions 39 and 41 of the monocrystalline ferrites of the lead-in core limb 34 and the lead-out core limb 35 and the gap-depth extension 36 of the magnetic head 8 or the magnetic head 9 can be determined and fixed in a simple manner. A device 1 having a magnetic head 8 or a magnetic head 9 with very satisfactory mechanical and magnetical properties is then obtained so that each magnetic head 8 or 9 has very satisfactory recording and reproduction properties throughout its lifetime and thus very satisfactory recording and reproducing conditions are ensured for a long period of operation of the device 1.

In the magnetic head 8 and the magnetic head 9 of the device 1, the angle $\Theta_E$ preferably ranges between 35° and 80°, while the constant angle value A ranges between 10° and 25°. To obtain very satisfactory and long-lasting recording and reproducing conditions in the device 1 and very satisfactory magnetical and mechanical properties and thus very satisfactory and long-lasting recording and reproduction properties of the magnetic head 8 or 9, the angle $\Theta_E$ is fixed at 53° and the angle $\Theta_A$ is fixed at 35°.

Figure 6:
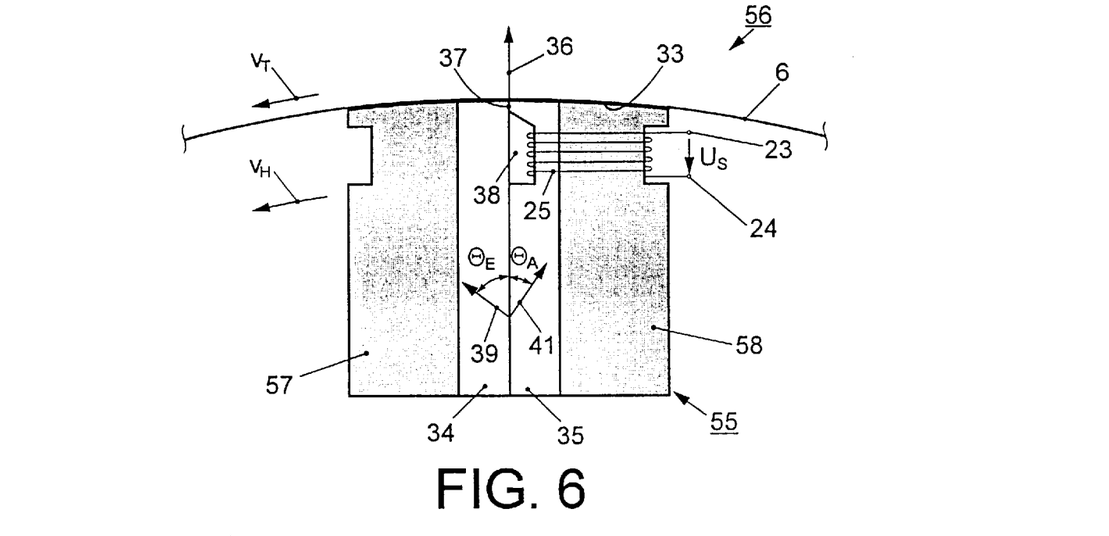
FIG. 6 shows a magnetic head of a recording and reproducing device in accordance with a second embodiment of the invention, which magnetic head is constituted by four core limbs.

FIG. 6 shows a magnetic head 55 of a recording and reproducing device 56 in accordance with a second embodiment of the invention. The magnetic head 55 is constituted by four core limbs. In addition to the lead-in core limb 34 and the lead-out core limb 35, both of which are formed from monocrystalline ferrite, the magnetic head 55 has a first terminating core limb 57 consisting of a polycrystalline ferrite and a second terminating core limb 58 also consisting of a polycrystalline ferrite, said first terminating core limb 57 being connected to the lead-in core limb 34 and said second terminating core limb 58 being connected to the lead-out core limb 35, with all core limbs 34, 35, 57 and 58 terminating in the head face 33 of the magnetic head 55. Since a polycrystalline ferrite has only very small magnetostrictive properties, the magnetic circuit of the magnetic head 55 constituted by the four core limbs 34, 35, 57 and 58 has very small magnetostrictive properties. Even when vibrations occur in the magnetic head 55, only negligibly small magnetic flux changes are produced due to the small magnetostrictive properties of the overall magnetic circuit, so that the development of rubbing noise is additionally impeded. In the device 56 with the magnetic head 55 it is then achieved that the magnetic head 55 has very satisfactory and long-lasting recording and reproduction properties and the device 56 has very satisfactory recording and reproducing conditions for a long period of operation.

Figure 8:
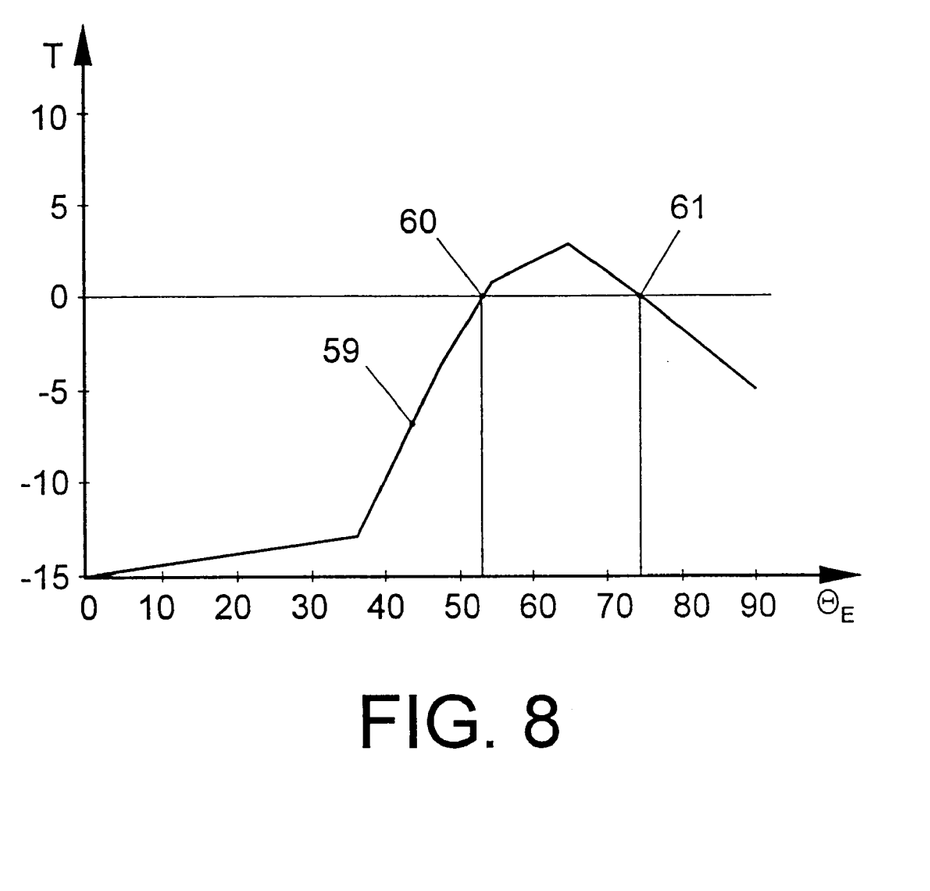
FIG. 8 is a diagram in which the dependence of the step depth T on the angle $\Theta_E$ of the mechanical main directions of lead-in core limbs of magnetic heads is shown, whose lead-out core limbs have a mechanical main direction at a given angle $\Theta_A$ which is 35°.

FIG. 8 shows a diagram in which the dependence of the step depth T on the angle $\Theta_E$ of the mechanical main directions of lead-in core limbs of magnetic heads is shown, whose lead-out core limbs have a mechanical main direction at a given angle $\Theta_A$. In a trial series, lead-out core limbs having their mechanical main direction at an angle $\Theta_A$ of 35° were combined with different lead-in core limbs having their mechanical main direction at different angles $\Theta_E$ ranging between 0° and 90°, so as to form magnetic heads. After a prescribed trial period of these magnetic heads, the depth of a step which had formed in the area of the transducing gap in the head face of the magnetic heads was measured. The results of the trial series are shown by way of curve 59 in FIG. 8.

As can be seen from the diagram in FIG. 8, a step can be prevented by fixing the angle $\Theta_E$ at 53° or $\Theta_E$ at 74.5° in a magnetic head according to the invention in which the mechanical main direction of the lead-out core limb has an angle $\Theta_A$ of 35°. This is determinable with the aid of the points of intersection 60 and 61. The point of intersection 60 at the angle $\Theta_E = 53°$ corresponds to the point of intersection 52 in FIG. 7. The point of intersection 61 at the angle $\Theta_E = 74.5°$ corresponds to the point of intersection 62 in FIG. 7. However, angles $\Theta_E$ and $\Theta_A$ fixed at 53° and 35°, respectively, have proved to be very favorable in a magnetic head according to the invention because it has very satisfactory magnetical recording and reproduction properties at these values.

It should be noted that a device according to the invention may alternatively be constituted by a recording device which may be implemented only for recording input signals of the recording device on a record carrier. Similarly, a device according to the invention may be constituted by a reproducing device which is only implemented to reproduce signals recorded on a record carrier. It may further be noted that a magnetic head according to the invention may be implemented only for reproducing signals recorded on a record carrier. Similarly, a magnetic head according to the invention may be implemented only for recording signals on a record carrier.

We claim:

1. A recording and/or reproducing device having at least one magnetic head whose head face can be brought to a scanning contact with a magnetic record carrier, in which scanning contact a relative movement which is essentially parallel to a reference plane occurs between the record carrier and the magnetic head, said magnetic head having a lead-in core limb and a lead-out core limb both of which terminate in the head face and jointly constitute a transducing gap terminating in a gap-depth extension in the head face and enclosing a given angle of inclination with respect to the reference plane, both core limbs consisting of a monocrystalline ferrite in which the (110) planes of the monocrystalline ferrites of the two core limbs extend essentially perpendicularly to the transducing gap, the lead-in core limb having a mechanical main direction in a <100>-direction of its monocrystalline ferrite, which main direction is in the (110) plane and encloses a first acute angle $\Theta_E$ with respect to the gap-depth extension in the lead-in core limb, and the lead-out core limb having a mechanical main direction in a <100>-direction of its monocrystalline ferrite, which main direction is in the (110) plane and encloses a second acute angle $\Theta_A$ with respect to the gap-depth extension in the lead-out core limb, and in which a record carrier wears off ferrite material on the two core limbs in the area of the head face when there is a relative movement between said record carrier and the magnetic head, characterized in that the first acute angle $\Theta_E$ between the mechanical main direction of the monocrystalline ferrite of the lead-in core limb and the gap-depth extension is larger than the second acute angle $\Theta_A$ between the mechanical main direction of the monocrystalline ferrite of the lead-out core limb and the gap-depth extension, and in that, for forming the magnetic head, the lead-in core limb and the lead-out core limb are combined at such differently large acute angles $\Theta_E$ and $\Theta_A$ between the mechanical main directions of the monocrystalline ferrites and the gap-depth extension that ferrite material is uniformly worn off both core limbs at essentially the same wear rate when there is a relative movement between the record carrier and the magnetic head.

2. A device as claimed in claim 1, characterized in that the acute angles $\Theta_E$ and $\Theta_A$ between the mechanical main directions of the monocrystalline ferrites of the lead-in core limb and the lead-out core limb and the gap-depth extension are defined by the equation $\Theta_E = \Theta_A + A$, in which A is a constant angle value.

3. A device as claimed in claim 2, characterized in that the angle $\Theta_E$ ranges between 35° and 80° and the constant angle value A ranges between 10° and 25°.

4. A device as claimed in any one of the preceding claims, characterized in that the angle $\Theta_E$ has the angle value $\Theta_E = 53°$ and the angle $\Theta_A$ has the angle value $\Theta_A = 35°$.

5. A device as claimed in any one of the preceding claims, characterized in that, in addition to the lead-in core limb and the lead-out core limb, the magnetic head has at least one terminating core limb consisting of a polycrystalline ferrite which is connected to one of the two core limbs and terminates in the head face.

6. A magnetic head for use in a recording and/or reproducing device having at least one magnetic head whose head face can be brought to a scanning contact with a magnetic record carrier, in which scanning contact a relative movement which is essentially parallel to a reference plane occurs between the record carrier and the magnetic head, said magnetic head having a lead-in core limb and a lead-out core limb both of which terminate in the head face and jointly constitute a transducing gap terminating in a gap-depth extension in the head face and enclosing a given angle of inclination with respect to the reference plane, both core limbs consisting of a monocrystalline ferrite in which the (110) planes of the monocrystalline ferrites of the two core limbs extend essentially perpendicularly to the transducing gap, the lead-in core limb having a mechanical main direction in a <100>-direction of its monocrystalline ferrite, which main direction is in the (110) plane and encloses a first acute angle $\Theta_E$ with respect to the gap-depth extension in the lead-in core limb, and the lead-out core limb having a mechanical main direction in a <100>-direction of its monocrystalline ferrite, which main direction is in the (110) plane and encloses a second acute angle $\Theta_A$ with respect to the gap-depth extension in the lead-out core limb, and in which a record carrier wears off ferrite material on the two core limbs in the area of the head face when there is a relative movement between said record carrier and the magnetic head, characterized in that the first acute angle $\Theta_E$ between the mechanical main direction of the monocrystalline ferrite of the lead-in core limb and the gap-depth extension is larger than the second acute angle $\Theta_A$ between the mechanical main direction of the monocrystalline ferrite of the lead-out core limb and the gap-depth extension, and in that, for forming the magnetic head, the lead-in core limb and the lead-out core limb are combined at such differently large acute angles $\Theta_E$ and $\Theta_A$ between the mechanical main directions of the monocrystalline ferrites and the gap-depth extension that ferrite material is uniformly worn off both core limbs at essentially the same wear rate when there is a relative movement between the record carrier and the magnetic head.

7. A magnetic head as claimed in claim 6, characterized in that the acute angles $\Theta_E$ and $\Theta_A$ between the mechanical main directions of the monocrystalline ferrites of the lead-in core limb and the lead-out core limb and the gap-depth extension are defined by the equation $\Theta_E = \Theta_A + A$, in which A is a constant angle value.

8. A magnetic head as claimed in claim 7, characterized in that the angle $\Theta_E$ ranges between 35° and 80° and the constant angle value A ranges between 10° and 25°.

9. A magnetic head as claimed in any one of claims 6 to 8, characterized in that the angle $\Theta_E$ has the angle value $\Theta_E = 53°$ and the angle $\Theta_A$ has the angle value $\Theta_A = 35°$.

10. A magnetic head as claimed in any one of claims 6 to 9, characterized in that, in addition to the lead-in core limb and the lead-out core limb, the magnetic head has at least one terminating core limb consisting of a polycrystalline ferrite which is connected to one of the two core limbs and terminates in the head face.

* * * * *